United States Patent [19]
Greenberg

[11] 4,401,690
[45] Aug. 30, 1983

[54] THERMOCHROMIC VANADIUM OXIDE WITH DEPRESSED SWITCHING TEMPERATURE

[75] Inventor: Charles B. Greenberg, Murrysville, Pa.

[73] Assignee: PPG Industries, Inc., Pittsburgh, Pa.

[21] Appl. No.: 344,906

[22] Filed: Feb. 1, 1982

[51] Int. Cl.³ .................... B05D 5/12; B05D 3/02; C03C 17/245
[52] U.S. Cl. .................................. 427/87; 427/109; 427/160
[58] Field of Search .................. 427/87, 109, 160

[56] References Cited

U.S. PATENT DOCUMENTS 3,483,110  12/1969  Rozgonyi .................. 204/192
4,307,942  12/1981  Chahroudi ................ 350/353

Primary Examiner—James R. Hoffman
Attorney, Agent, or Firm—Donna L. Seidel

[57] ABSTRACT

A method is disclosed for producing a thermochromic window comprising a glass substrate and a coating containing VO₂ with a depressed switching temperature by doping the VO₂ film with a compound of a metal having an ionic radius larger than that of vanadium, such as tungsten, niobium, tantalum, iridium or molybdenum.

5 Claims, 2 Drawing Figures

THERMOCHROMIC VANADIUM OXIDE WITH DEPRESSED SWITCHING TEMPERATURE

FIELD OF THE INVENTION

The present invention relates generally to the art of metal oxide coated glass for solar energy control and more particularly to the art of vanadium oxide coated glass.

THE PRIOR ART

U.S. Pat. No. 3,483,110 to Rozgonyi discloses a method for making thin films of $VO_2$ that possess the essential metal-semiconductor phase transition exhibited by the single crystal form, and that do not suffer deterioration under repeated cycling through the transition. In one embodiment, the process involves the steps of sputtering a $V_2O_5$ cathode in an inert atmosphere in the presence of a desired substrate to produce an amorphous film of $VO_x$, where x is greater than 1.5 but less than 2, and then either weakly oxidizing the film to $VO_2$, or strongly oxidizing the film to $V_2O_5$ and then reducing the $V_2O_5$ to $V_2O_3$. Alternatively, a vanadium cathode may be sputtered in an inert atmosphere in a similar manner to produce a polycrystalline vanadium film, which is first oxidized to $V_2O_5$ and then reduced to $V_2O_3$.

U.S. Patent Application Ser. No. 344,257 filed on even date herewith entitled "Chemical Vapor Deposition of Vanadium Oxide Coatings" discloses chemical vapor deposition of vanadium oxide films in general and thermochromic $VO_2$ films in particular.

SUMMARY OF THE INVENTION

The present invention involves the deposition of thermochromic films containing $VO_2$ which have a lower switching temperature range than the normal transition temperature of about 68° C. The depressed switching temperature range results from doping the $VO_2$ film with other materials such as niobium, molybdenum, iridium, tantalum or tungsten compounds. Glass coated with a vanadium oxide film in accordance with the present invention is particularly useful for passive solar energy control since it has significantly lower infrared transmittance in the conductive phase compared with the infrared transmittance of the semiconducting phase, and has a sufficiently low transition temperature range to be useful in a wide variety of climatic conditions.

BRIEF DESCRIPTION OF THE PREFERRED EMBODIMENTS

Numerous metal and/or metal oxide coatings are known to be useful for solar energy control. Such coatings typically reflect a high proportion of incident solar energy to minimize heat gain inside a structure, while allowing sufficient transmission of the visible portion of the spectrum for interior lighting. A particularly desirable architectural window for passive solar energy control would be a variable transmittance window that would minimize transmittance in the summer when the temperature is high and incident solar energy is greatest, but transmit solar energy when the temperature is low. Variable transmittance in a glass window is achievable by photochromism, which involves darkening in response to solar ultraviolet radiation, typically employing silver halides. However, absorption by the glass of solar radiation over the full special range results in heating and bleaching which deteriorate the photochromic properties of the glass.

Figure 1:
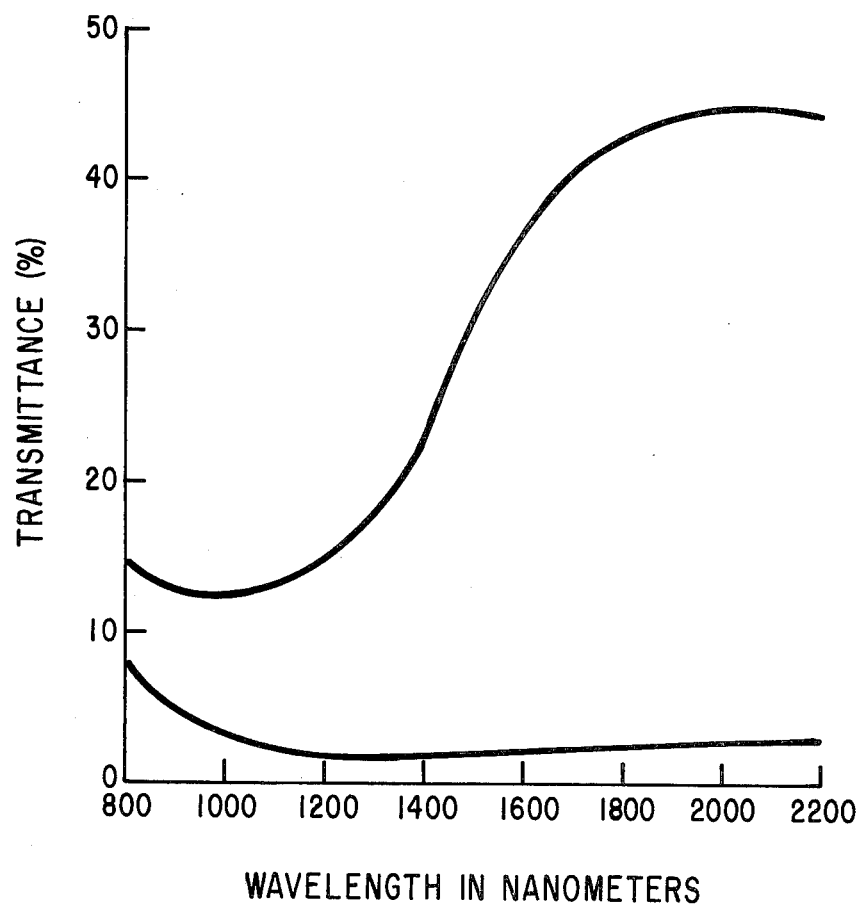
FIG. 1 illustrates the optical switching of a doped vanadium oxide film in accordance with the present invention by comparing the solar energy transmittance of a coated glass sample at ambient temperature with the transmittance of the sample heated above its transition temperature.

The present invention achieves variable transmittance by means of a thermochromic response, the result of an optical switching when a vanadium oxide film is heated by absorbed solar energy. Vanadium oxide, $VO_2$, undergoes a phase transition from the monoclinic crystallographic class to the tetragonal at a nominal temperature of 68° C. This phase transition is accompanied by a rapid switch in electrical resistivity from semiconducting behavior to conductive, a resistivity change of about $10^3$ to $10^5$-fold. In addition to the electroconductive switching, the vanadium oxide film also undergoes a substantial optical switching in the infrared spectral region as shown in FIG. 1.

To be useful as a thermochromic window for passive solar energy control, the vanadium oxide coating should provide large optical switching in the solar infrared spectral range, a temperature range for switching that correlates with the actual temperatures attained by a window exposed to solar radiation, and adequate switching properties at a film thickness thin enough to avoid iridescence. These properties may be provided by a vanadium oxide film prepared in accordance with the present invention. In particular, $VO_2$ films having depressed switching temperatures are prepared in accordance with the present invention by doping with niobium, molybdenum, iridium, tantalum or tungsten oxides, these metal cations having a larger ionic radius than that of vanadium.

Thin films of vanadium oxide can be prepared on a variety of glass substrates such as soda-lime-silica float glass and borosilicate glass according to the method taught in U.S. Application Ser. No. 344,257 filed on even date herewith entitled "Chemical Vapor Deposition of Vanadium Oxide Coatings," the disclosure of which is incorporated herein by reference. In one embodiment of the present invention, glass substrates are immersed in a solution comprising one part by volume vanadium i-propylate, three parts by volume 2-propanol and about 2.5 to 4 grams per liter $WOCl_4$ at room temperature. Film formation proceeds by hydrolysis in ambient air. The coated glass is then heated, preferably in a reducing atmosphere, more preferably in an atmosphere of forming gas containing an aromatic hydrocarbon, to a sufficient temperature for a sufficient time to form a thermochromic $VO_2$ film which switches over a temperature range above room temperature but below the characteristic 68° C. The $VO_2$ film is semiconducting at ambient temperatures, with total solar infrared transmittance as shown in FIG. 1, while above the transition temperature range, the $VO_2$ containing film is characteristically conductive and has a solar infrared transmittance less than about 10 percent as shown in FIG. 1.

The optical switching properties of the vanadium oxide coating are determined by scanning in the transmittance mode with a Cary 14 spectrophotometer across the spectral range of 0.8 to 2.2 microns. The vanadium oxide coated glass sample is held in an insulated holder with a beam pass opening. Two cylindrical 25 watt heaters in contact with the glass edges just outside the beam pass opening are used to heat the vanadium oxide coated glass sample through the switching temperature range. A spectral scan is run both before and after heating without moving the sample.

Figure 2:
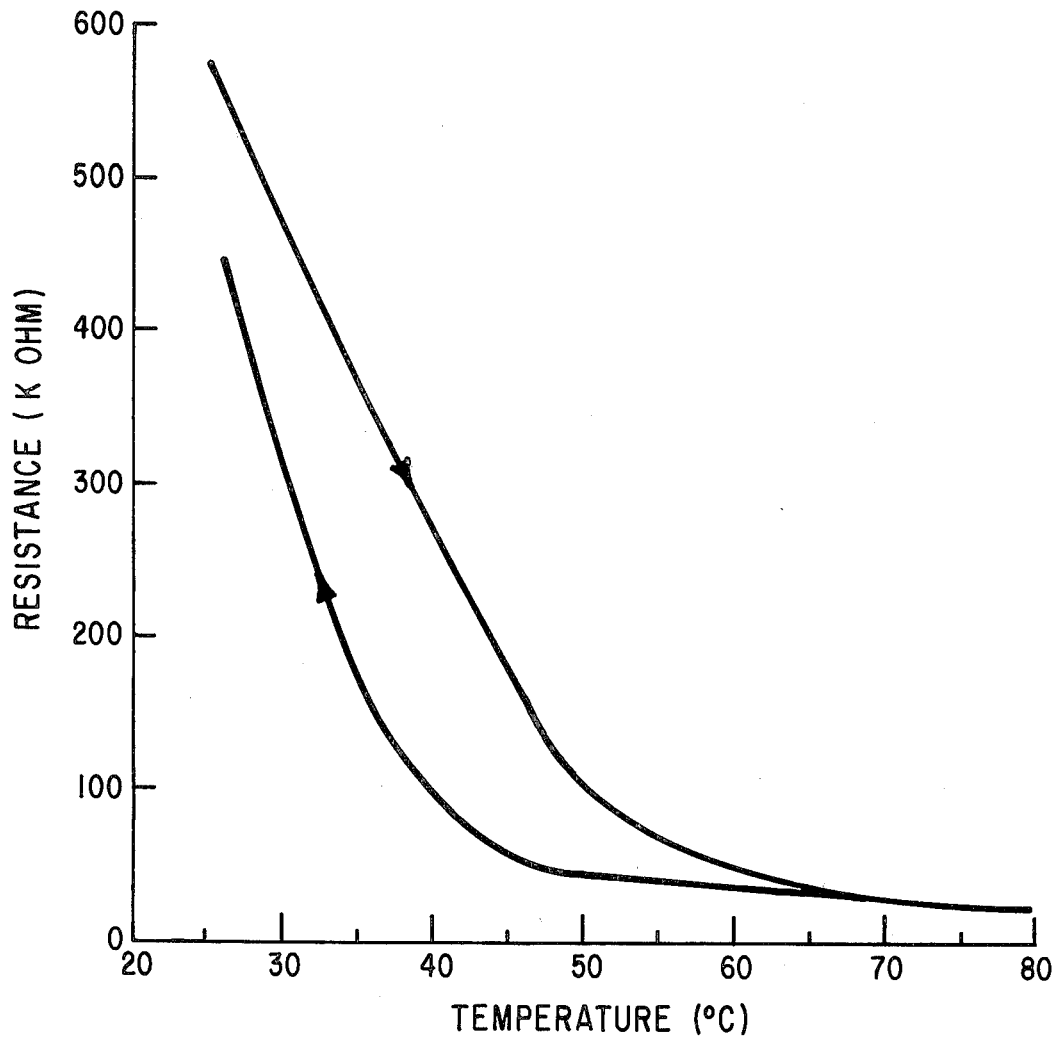
FIG. 2 illustrates the transition temperature range of a doped vanadium oxide film in accordance with the present invention by showing the resistance as a function of temperature.

The temperature range of the optical switching is determined in a separate experiment, which also provides a measure of the thermoresistive switching. The flat-head probe of an Omega Amprobe ® Fastemp temperature measuring device (available from Omega Engineering, Inc., Stanford, Connecticut) is clipped flush onto a narrow strip of the vanadium oxide film surface. In close proximity on either side of the probe are alligator clips connected to an ohmmeter for measurement of resistance. The resistance is measured as a function of temperature as the coated sample is heated through the transition temperature range. A sample measurement is illustrated in FIG. 2.

In general, it appears that of the $10^3$ to $10^5$-fold thermoresistive switching capability of vanadium oxide ($VO_2$), a thermoresistive switching on the order of about two-fold is sufficient to provide optical switching of the required magnitude for passive solar energy control in the spectral range of 0.8 to 2.2 microns. The temperature range for optical switching, substantially within the range of 25° to 55° C. as shown in FIG. 2, is significantly lower than the characteristic 68° C. known for single crystals of vanadium oxide ($VO_2$) and undoped thin films of vanadium oxide, and therefore correlates well with the approximate range of about 45° to 60° C. actually attained in windows in summertime southern exposure. Also, it appears that optical switching properties are attainable with vanadium oxide films sufficiently thin to avoid visible iridescence.

The present invention will be further understood from the description of a specific example which follows.

EXAMPLE I

A clear sheet of float glass is immersed in a solution comprising one part by volume vanadium i-propylate, three parts by volume 2-propanol and about 4 grams per liter $WOCl_4$ at ambient temperature. The glass is withdrawn and hydrolysis proceeds in the ambient air to form a clear film, yellow by transmission. The coated glass is then heated to 375° C. in forming gas. For a period of one minute, the coated glass is exposed to hydrocarbon vapors carried in a stream of forming gas. The hydrocarbon vapors are obtained by heating at 160° C. a bath of Califlux TT, a process oil available from Witco Chemical Corp., Los Angeles, California. The resulting vanadium oxide ($VO_2$) coated glass exhibits optical switching as shown in FIG. 1, and has a transition temperature as shown in FIG. 2.

The above example is offered to illustrate the present invention. Various other glass substrates, such as borosilicate glass, may also be used in the production of thermochromic windows in accordance with the present invention. Other vanadium compounds, and other dopants such as niobium, molybdenum, iridium and tantalum compounds, as well as other tungsten compounds, may also be used. Other methods for depositing vanadium oxide, such as chemical vapor and vacuum deposition, may also be employed. A preferred method is chemical vapor deposition as described in U.S. Application Ser. No. 344,257 filed on even date herewith and entitled "Chemical Vapor Deposition of Vanadium Oxide Coatings," the disclosure of which is incorporated herein by reference.

The scope of the present invention is defined by the following claims.

I claim:

1. In a method for making a thermochromic window comprising the steps of contacting a surface of a glass substrate with a vanadium compound and heating the glass substrate to a sufficient temperature to obtain a vanadium oxide film comprising $VO_2$, the improvement which comprises doping said film with a compound which depresses the switching temperature of $VO_2$.

2. The method according to claim 1, wherein the dopant is a compound of a metal, the ionic radius of which is larger than the ionic radius of vanadium.

3. The method according to claim 2, wherein the compound which depresses the switching temperature of $VO_2$ is selected from compounds of niobium, tantalum, molybdenum, iridium and tungsten.

4. The method according to claim 1, wherein the vanadium compound is selected from the group consisting of vanadium n-propylate, vanadium ethylate, vanadium butylate, vanadium oxychloride and mixtures thereof.

5. The method according to claim 4, wherein the glass is contacted at ambient temperature with a composition comprising vanadium i-propylate and tungsten oxychloride to form a film which is subsequently heated to obtain a tungsten-doped thermochromic film comprising $VO_2$.

* * * * *